US006304732B1

United States Patent
Myers et al.

(10) Patent No.: US 6,304,732 B1
(45) Date of Patent: Oct. 16, 2001

(54) STOCK LIBRARY MECHANISM FOR PROVIDING VISUAL REPRESENTATIONS OF STOCK OBJECTS IN AN IMAGE REPRODUCING SYSTEM

(75) Inventors: Thomas Arthur Myers; Jonathan A. Dorsey, both of Rochester; Richard M. Hraber, Bloomfield; Kenneth C. Favata, Pittsford, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/444,485

(22) Filed: Nov. 19, 1999

(51) Int. Cl.[7] .................................................. G03G 15/00
(52) U.S. Cl. .............................. 399/81; 399/391
(58) Field of Search ................... 399/81, 75, 76, 399/77, 79, 80, 391; 345/348, 349, 145, 146

(56) References Cited

U.S. PATENT DOCUMENTS 5,229,814   7/1993  Hube et al. ..................... 355/203
5,949,417 * 9/1999  Calder ............................. 345/342

* cited by examiner

*Primary Examiner*—Arthur T. Grimley
*Assistant Examiner*—Hoang Ngo
(74) *Attorney, Agent, or Firm*—Lahive & Cockfield LLP (57) ABSTRACT

A stock library contains objects that encapsulate attributes of respective stocks that may be used in an image reproducing apparatus. The objects may include visual representations, such as icons, for representing the stocks. A stock library window may display the icons and selected attributes of the stocks to provide a visual catalog of the stocks that are available to an operator. The visual representations may be dragged and dropped to program paper trays, select stocks for print jobs and provide other behavior.

26 Claims, 7 Drawing Sheets

STOCK LIBRARY MECHANISM FOR PROVIDING VISUAL REPRESENTATIONS OF STOCK OBJECTS IN AN IMAGE REPRODUCING SYSTEM

TECHNICAL FIELD

The present invention relates generally to image reproducing systems and more particularly to a stock library mechanism for providing visual representations of stock objects in an image reproducing system.

BACKGROUND OF THE INVENTION

Many conventional image reproducing systems, such as copiers or printers, use multiple stocks. Stocks are printing substrates, such as paper, on which printed matter is printed. Stocks may vary as to thickness, width, length, color, material composition and other characteristics.

In conventional image reproducing systems, an operator must be aware of what stocks are available for use with the system. The operator must manually place the stocks into the paper tray for the system and program the paper tray accordingly. Often times, an operator must take a physical inventory of the stocks that are available in a given print shop in order to be aware of what stocks are available. Unfortunately, a print shop may have 1000 or more stocks. As such, identifying stocks, determining what stocks to use and programming the paper trays is often cumbersome for an operator.

SUMMARY OF THE INVENTION

The present invention addresses the above-described problems of conventional image reproducing systems. In particular, the present invention provides a computerized stock library for listing available stocks that an operator may employ with an image reproducing system. In one embodiment of the present invention, attributes regarding stocks are encapsulated into objects. The objects have associated visual representations, and these visual representations are made visible to the operator to assist in selecting stocks for print jobs. The visual representations may be, for example, icons. The operator may scroll through the icons available in the stock library to determine what stocks are available. In addition, the objects may support drag and drop behavior such that the operator may drag and drop a stock icon at a destination to program a paper tray or to identify what stock is to be used in a given print job.

In accordance with one aspect of the present invention, a method is practiced in an image output device that has a display that is visible to a user. A selected stock on which output is to be generated includes a number of different attributes. The attributes of the selected stock are encapsulated into an object, and a visual representation of the object is generated on the display. Other stocks may also have associated objects that encapsulate attributes of the stocks. The visual representations may be icons or other graphical representations.

In accordance with another aspect of the present invention, a method is practiced in an image reproducing apparatus that has a display and an input device. A visual representation of a given stock is provided on the display. In response to a user dragging and dropping the visual representation of the stock, the image reproducing apparatus is configured to account for attributes of the stock. The configuring may entail, for example, programming a paper tray for the stock. Alternatively, the configuring may entail obtaining stocks that are to be used in printing a print job.

In accordance with a further aspect of the present invention, an image reproducing apparatus includes a display for viewing a visual representation of a selected stock. The apparatus includes a stock control facility and an input device for use by the user. The stock control facility is used configure the apparatus to employ a selected stock in response to the user using the input device to drag and drop the visual representation of the selected stock.

In accordance with an additional aspect of the present invention, a printer includes a printer component for printing and a print station for controlling the printing component. The print station includes an input device, a display device and a stock library containing visual representations of stocks to be output on the display. The print station further includes a facility for configuring the printer in response to a user dragging and dropping one of the visual representation with the input device.

BRIEF DESCRIPTION OF THE DRAWINGS

An illustrative embodiment of the present invention will be described below relative to the following drawings.

DETAILED DESCRIPTION OF THE INVENTION

The illustrative embodiment provides a stock library that assists an operator of an image reproducing apparatus in managing stocks. The stock library provides visual representations of the stocks that are available to the operator. The stock library may also list attribute information that identifies attributes of the stock. The stock library allows the operator to quickly identify which stocks are available and to choose stocks for given print jobs and/or paper trays.

In the illustrative embodiment, each stock has an associated object. The object encapsulates attributes of the stock, such as color, size, weight and the like. In addition, the object has a visual representation, such as an icon, that may be displayed as part of the stock library.

The visual representations of the stocks may be dragged and dropped in the illustrative embodiment. Thus, an operator may program a paper tray by dragging a visual representation of a stock and dropping the visual representation of the stock onto a target associated with the paper tray. Furthermore, the visual representation of a stock may be dropped on a target to identify what stock is to be employed in a print job.

In order to clarify the discussion below, it is helpful to first define a few terms.

A "stock" refers to a printing substrate on which image reproducing apparatus may print content. The content may be affixed, fused, adhered or otherwise secured to the substrate.

An "object" refers to a structure that encapsulates both attributes and methods. The term "object" is used herein as commonly used within object oriented programming.

An "attribute" refers to a property or characteristic.

A "drag and drop" refers to an operation in which a user captures and moves a visual representation using a pointing device, such as a mouse, from an originating point to a destination point.

Figure 1:
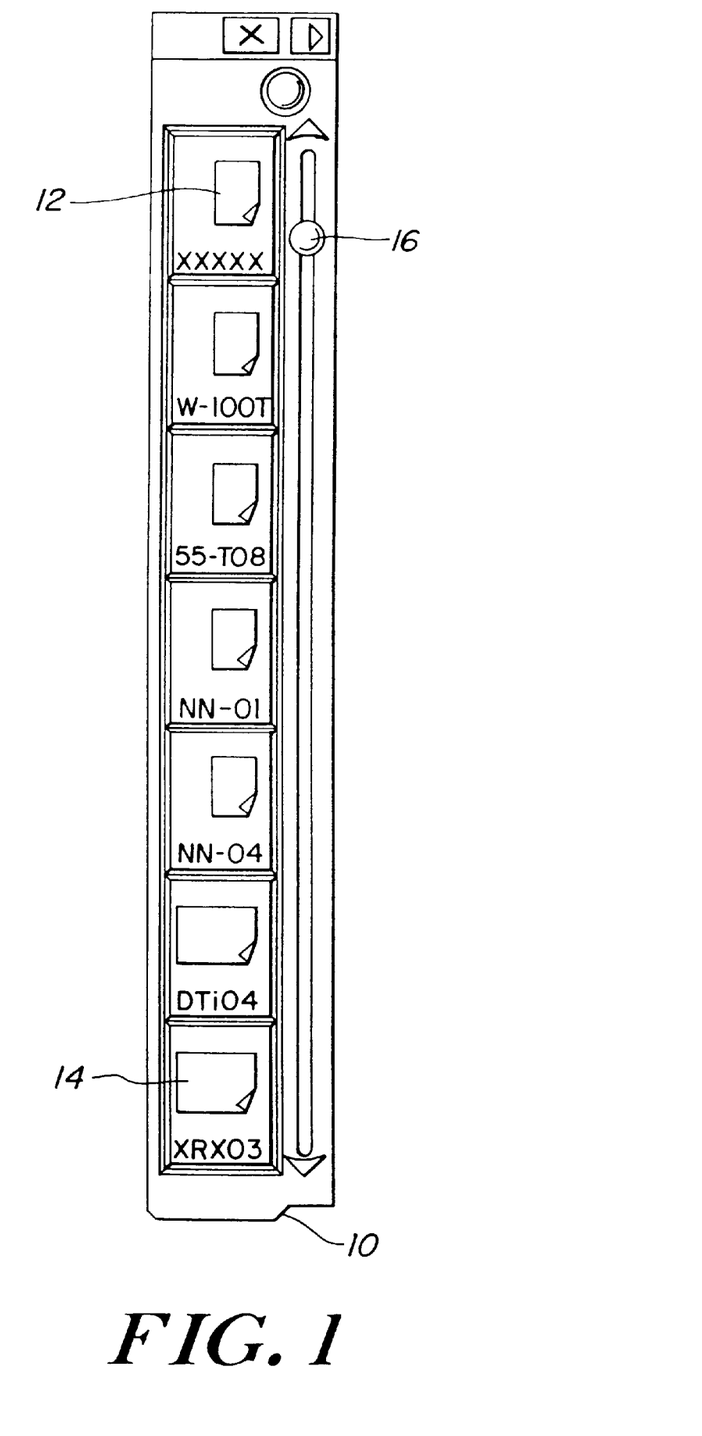
FIG. 1 depicts a stock library window that lists only the icons associated with stocks for the illustrative embodiment.

FIG. 1 depicts a first example of a stock library window 10 that displays the contents of a stock library. The stock library is a collection of objects that encapsulate information regarding stocks that may be used on an image reproducing apparatus. Those skilled in the art will appreciate that the present invention may also be practiced in non-object oriented environments, where the attributes of stocks are not encapsulated into object per se, but rather are held in data structures that are not objects.

The stock library window 10 depicted in FIG. 1, contains icons for the objects that encapsulate information regarding the attributes of various stocks. For example, icon 12 represents a first stock; whereas icon 14 represents a different stock. The nature of the icons depicted in the stocks may reflect attribute values for the stocks. For example, icons may reflect the colors or sizes of the respective stocks. For the stock library window depicted in FIG. 1, a scrollbar 16 is included. A user may use an input device, such as a mouse or other pointing device, to manipulate the scrollbar and scroll through the various stocks that are available. The stock library window 10 in FIG. 1 is one that conserves screen real estate. This window 10 depicts only the visual representations of the stocks (i.e., the icons) and identifying information underneath the icons.

Figure 2:
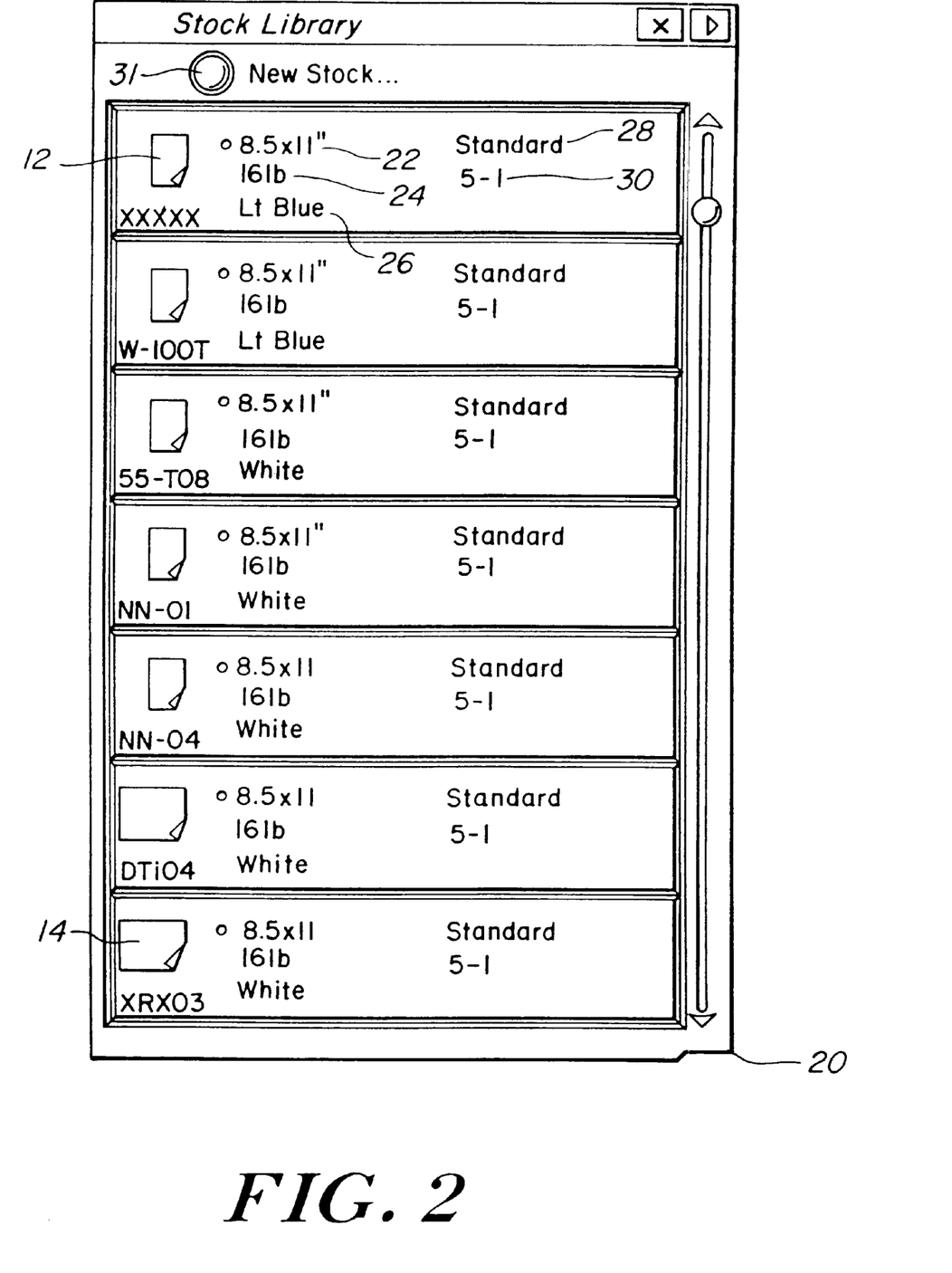
FIG. 2 depicts an illustrative stock library window wherein icons and attributes for the stock are listed.

FIG. 2 represents an alternative implementation of the stock library window 20. This stock library window 20 includes the icons 12 and 14, but also includes attributes information regarding the stocks associated with the icons. For the stock associated with icon 12, size information 22 and weight information 24 are listed in the stock library window 20. In addition, color information 26, paper type information 28 and modulus information 30 are also listed in the stock library window 20 depicted in FIG. 2. Those skilled in the art will appreciate that different attribute values may be depicted within the stock library window that differ from those shown in FIG. 2. For example, the color of the stock may be the only attribute listed in some embodiments. Furthermore, more than five attribute values may be listed for a given stock. Those skilled in the art will also appreciate that the visual representations of the stocks and the stock attribute values need not be displayed within a window but rather may be displayed in a different format on an image output device. Still further, the stock library may be partitioned into multiple windows such that selected stocks are shown in different windows. For example, all letter-sized stocks may be shown in one window; whereas all A4 stocks or legal size stocks may be shown in different windows.

Figure 3:
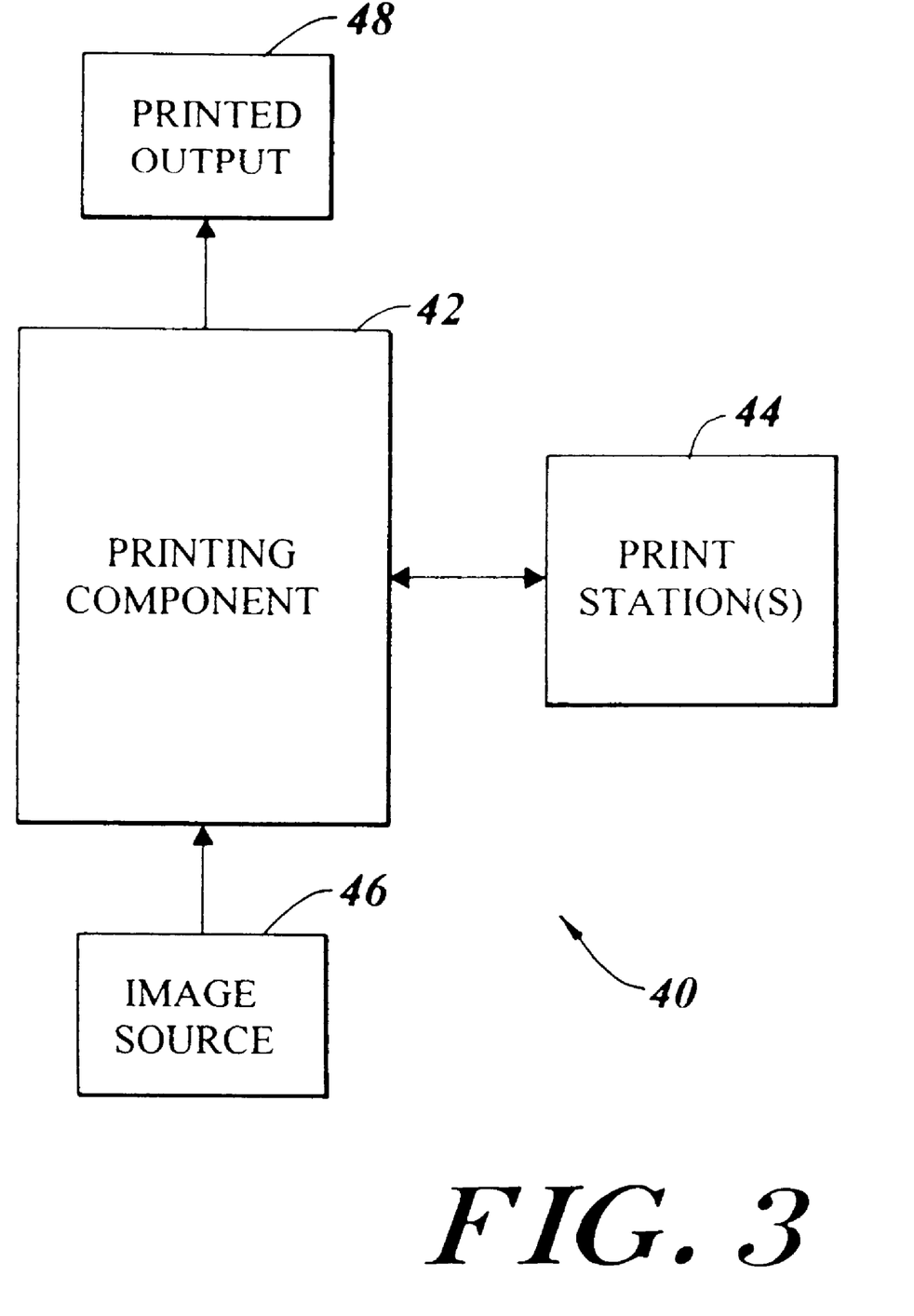
FIG. 3 is a block diagram of an image reproducing system that is suitable for practicing the illustrative embodiment.

The stock library may be used in an image reproducing apparatus (also referred to as an "image output device"), such as a printer, copier, facsimile machine or other device that is able to reproduce graphical content, including text. FIG. 3 depicts an example of an image reproducing system 40 that is suitable for practicing the illustrative embodiment of the present invention. Those skilled in the art will appreciate that the configuration shown in FIG. 3 is intended to be merely illustrative and not limiting of the present invention. The image reproducing system includes a printing component 42 that is responsible for performing the actual printing on one or more stocks. It is presumed for purposes of the discussion below that printing tasks are organized into "print jobs." The images to be printed originate from an image source 46. The image source 46 may include a scanner, a memory or other imaging source. The printing component 42 produces printed output 48 on one or more stocks. One or more print stations 44 are provided to allow an operator to monitor and potentially control activity out of the printing component 42.

Figure 4:
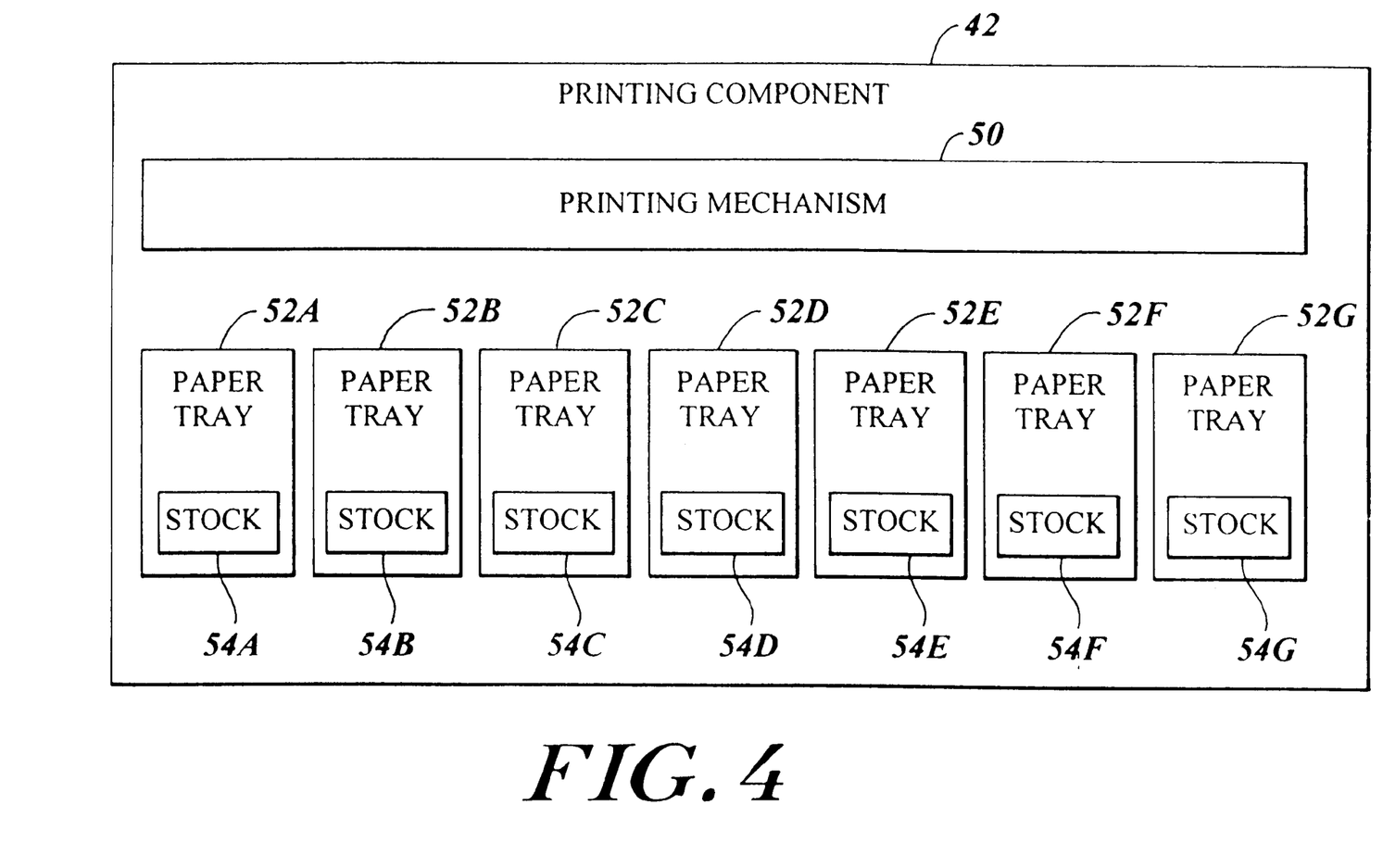
FIG. 4 is a block diagram depicting the printing component 42 of FIG. 3 in more detail.

In the illustrative embodiment, it is presumed that the printing component 42 is able to handle multiple stocks and is able to print jobs that include multiple stocks. FIG. 4 depicts and illustrative implementation of the printing component 42 in more detail. The printing component includes multiple paper trays 52A, 52B, 52C, 52D, 52E, 52F and 52G. Each of the paper trays 52A–52G includes a respective stock 54A, 54B, 54C, 54D, 54E, 54F and 54G. These paper trays 52A–52G may serve as sources of stock 54A–54G that are fed into printing mechanism 50 to reproduce graphical content and generate the printed output 48.

Figure 5:
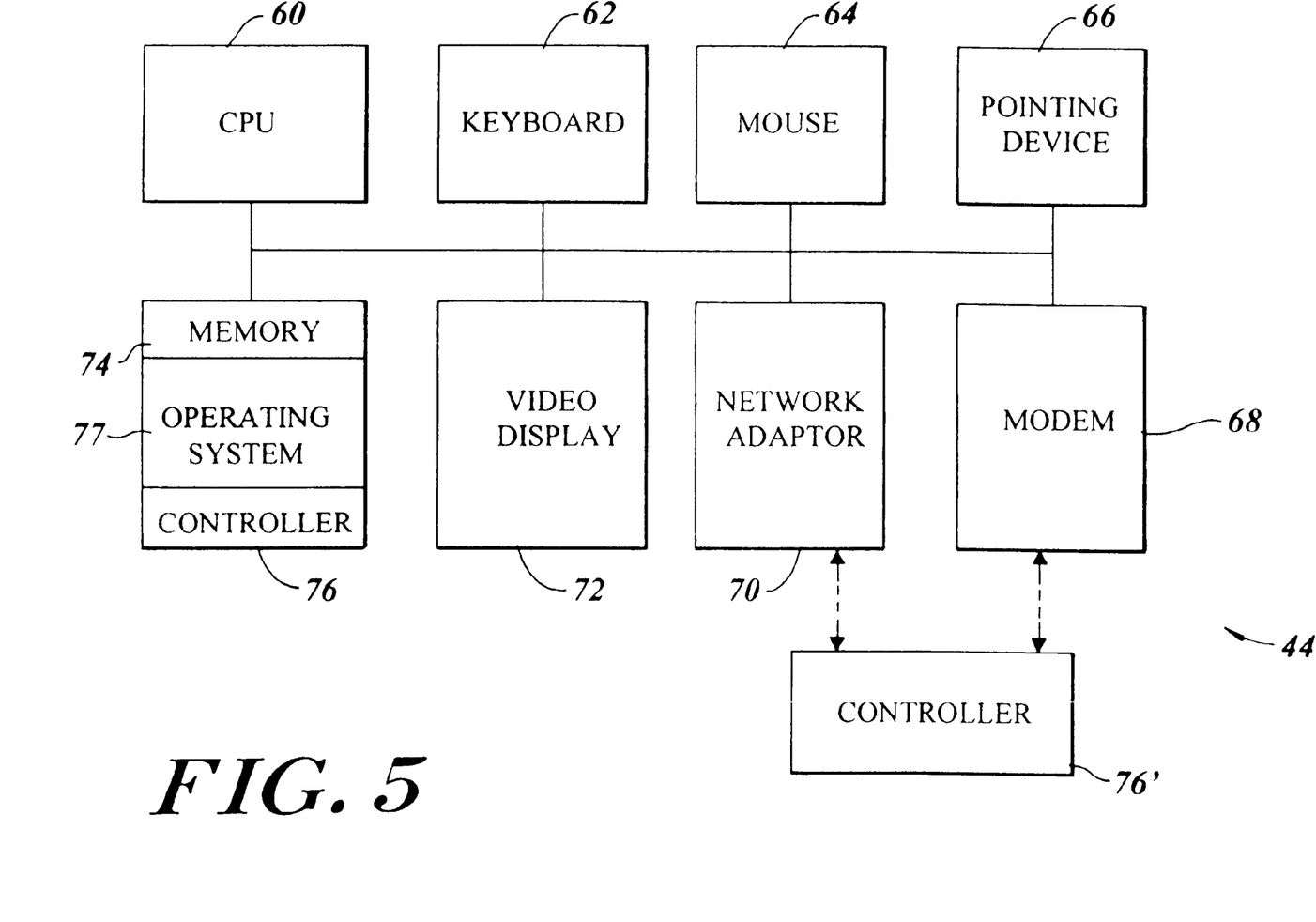
FIG. 5 is a block diagram depicting the print station 44 of FIG. 3 in more detail.

FIG. 5 depicts an implementation of the print station 44 in more detail. The print station 44 includes a central processing unit (CPU) 60 for executing instructions and overseeing operation of the print station. The CPU 60 may be any of a number of well-known conventional microprocessors. The print station 44 includes a keyboard 62 for enabling the operator to enter keyed input. In addition, the print station 44 includes a mouse 64 and may include one or more additional pointing devices 66. The print station 68 may include a modem for communicating with remote computing resources. The modem 68 may be a conventional data modem for enabling communication over analog telephone lines, a cable modem for enabling communications over cable lines or a wireless modem for enabling wireless communication. The print station 44 may include a network adapter 70 for interfacing the print station with a local area network (LAN). The print station may include a video display 72 for displaying video information.

The print station 44 includes memory 74 that may contain both primary memory and secondary memory. The memory 74 may include computer-readable media, such as optical disks or magnetic disks. These media may be removable such that they may be removed from devices and transported to other locations. The memory 74 holds a copy of an operating system 77. A suitable operating system is the Solaris operating system provided by Sun Microsystems, Inc. of Palo Alto, Calif. It is presumed that the operating system supports the use of objects and provides graphical widgets or other mechanisms for generating visual representations of the object. The memory 74 also holds the stock library 76. The stock library 76 includes the objects that encapsulate attributes of the stocks. These objects include methods for displaying visual representations of the stocks in a stock library window.

It should be appreciated that the stock library 76' may also be located remotely from the print station. Communication with the remote stock library 76' may be realized via the modem 68 or the network adapter 70. In one alternative embodiment, the stock library 76 is resident on the Internet or on another computer network and is accessible to the operator via the print station 44.

The image reproducing system 40 includes software for enabling an operator to view a paper tray attributes window 82 (FIG. 6) on the display 72 of the print station 44. This window 82 displays attributes of the stock for which the paper tray is currently programmed. If the paper tray is not currently programmed for a stock, these attributes have no values or have a default value.

Figure 6:
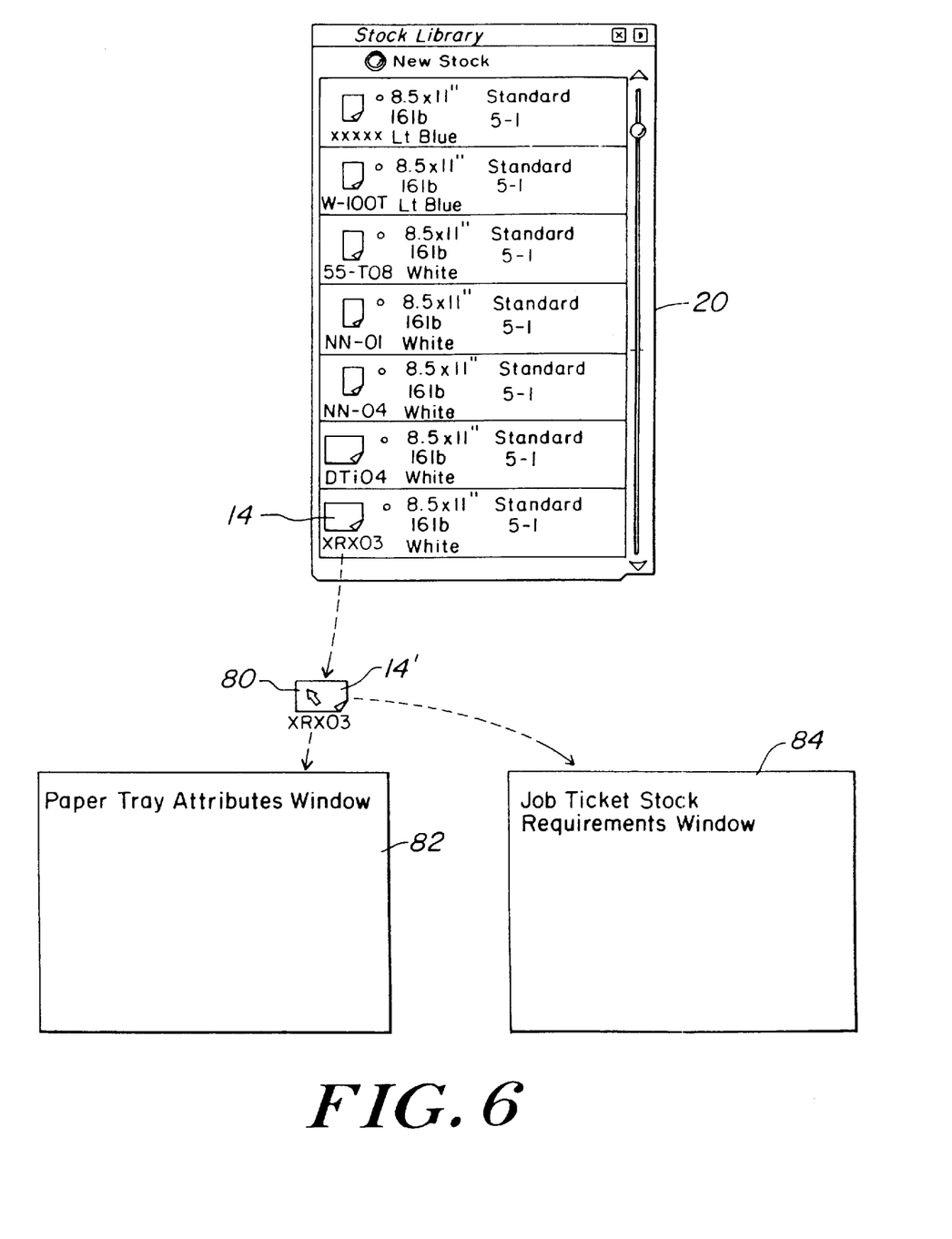
FIG. 6 depicts a dragging and dropping of an icon from a stock library window to other windows in the illustrative embodiment.
Figure 7:
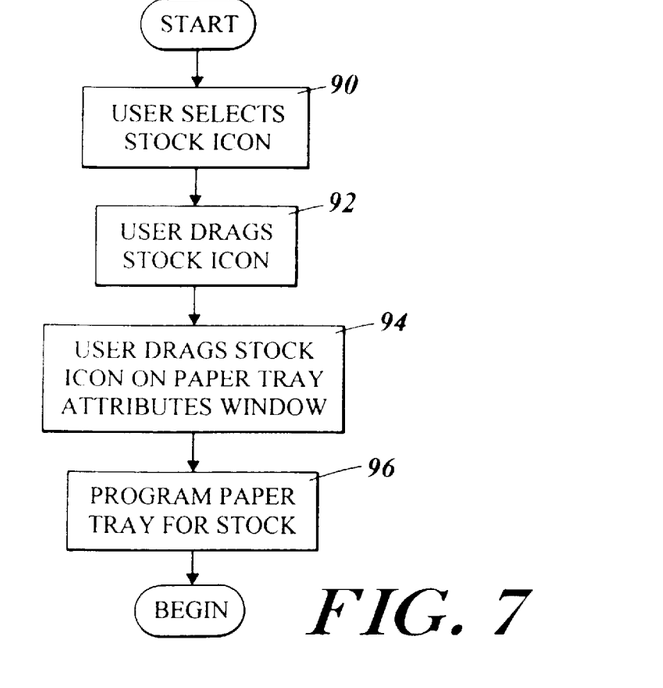
FIG. 7 is a flow chart illustrating steps that are performed when a stock icon is dragged and dropped to program a paper tray.

The operator may drag one of the icons out of the stock library window 20 and drop the icon into the paper tray attributes window 82 to program the paper tray associated with the paper tray attributes window. The operator may drag the icon by using a mouse 64, the pointing device 66, the keyboard 62 or other suitable device. FIG. 6 depicts the icon 14' as it is being dragged from the stock library window 20 to the paper tray attributes window 82. The mouse cursor 80 is positioned on the icon 14'. For illustrative purposes, it is helpful to consider the case where the operator uses the mouse 64 to perform a drag and drop operation. With the mouse 64, the operator initiated the drag and drop operation by positioning the mouse cursor 80 so that the hot spot of the mouse cursor resides over the icon 14 within the stock library's window. The operator then depresses one of the designated mouse buttons to select the stock icon (step 90 in FIG. 7). While keeping the mouse button depressed, the operator drags the icon 14' (which may change to a phantom form to provide a visual cue that the icon is being dragged) towards the destination (step 92 in FIG. 7). The operator then drops the stock icon on the paper tray attributes window 94 by releasing the mouse button after the icon 14' is positioned within the boundaries of the window (step 94 in FIG. 7). The paper tray is then programmed for the stock associated with the icon that was dropped on the paper tray attributes window 82 (step 96 in FIG. 7).

From a programmatic perspective, the object associated with icon 14 receives an event message at the beginning of the drag and drop informing the object that the mouse cursor is positioned over the icon for the object and then subsequently receives an event message indicating that the user has depressed the mouse button. When the user begins to move the mouse, the object knows that the user is attempting to conduct a drag and displays the icon in phantom form 14'. When the icon 14' is dropped in the paper tray attributes window 82, the target application that displays the paper tray attributes window knows that a drop has been performed and decides that the appropriate response is to extract the attributes from the object associated with the phantom icon 14' and to program the paper tray with these attributes.

Figure 8:
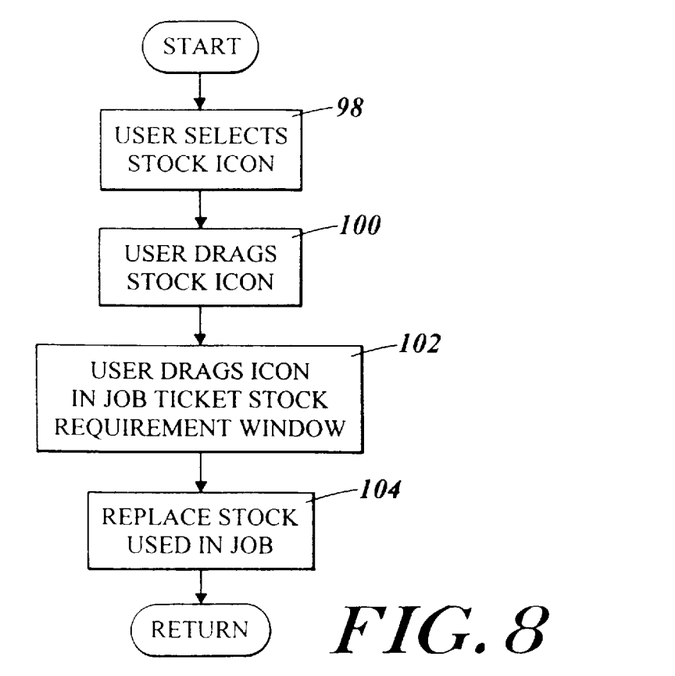
FIG. 8 is a flow chart depicting the steps that are performed when a stock icon is dragged and dropped to change stock that is used in a print job.

The operator may also drag an icon into a job ticket stock requirements window 84 as shown in FIG. 6. FIG. 8 is a flow chart depicting the steps that are performed in such an instance. Initially, the operator selects the stock icon (step 98 in FIG. 8). The operator drags the stock icon (step 100 in FIG. 8), and drops the icon in the job ticket stock requirements window 84 (step 102 in FIG. 8). The job ticket stock requirements window 84 specifies the stock requirements that are required by a given print job. The operator drops the icon representing a stock onto another representation of a stock within the job ticket stock requirements window 82 to replace the previously specified stock with the stock associated with the icon. As a result, the stock associated with the icon replaces the stock that was originally specified by the job ticket as shown in the job ticket stock requirements window (step 104 in FIG. 8).

Those skilled in the art will appreciate that the applications of drag and drop behavior are not limited solely to the two examples described above. For example, a user may be able to specify the stock used in a print job by dragging and dropping icons at a destination so as to specify which stocks are to be used for respective pages of the print job.

While the present invention has been described with reference to an illustrative embodiment thereof, those skilled in the art will appreciate that various changes in form and detail may be made without departing from the intended scope of the present invention as defined in the appended claims.

What is claimed is:

1. In an image output device having a display that is visible to a user, a method comprising the steps of:

providing a selected stock on which output is to be generated, wherein said selected stock has attributes;

encapsulating the attributes of the selected stock into a selected object;

storing said selected object in a memory location;

generating a an iconic representation of the selected object on the display;

determining initiation of a drag and drop operation of the iconic representation by the user; and configuring the image output device to account for the attributes of the selected stock, in response to the user dragging and dropping the iconic representation of the selected stock.

2. The method of claim 1, wherein the iconic representation of the selected object includes a visual representation of at least some of the attributes of the stock.

3. The method of claim 1, wherein the image output device may use multiple stocks and wherein the method further comprises the step of encapsulating attributes of each of the multiple stocks into respective objects.

4. The method of claim 1, wherein the image output device is a printer.

5. In an image reproducing apparatus having a display and an input device, a method, comprising the steps of:

providing an iconic representation of a given stock on the display to be used in the image reproducing apparatus;

determining initiation of a drag and drop operation of the iconic representation of a given stock by a user of the image reproducing apparatus; and in response to the initiation of the drag and drop operation of the iconic representation of the given stock by the user, configuring the image reproducing apparatus to account for the attributes of the given stock.

6. The method of claim 5, wherein the image reproducing apparatus includes a paper tray and wherein the step of configuring comprises programming the paper tray for the given stock.

7. The method of claim 5, wherein the image reproducing apparatus has a print job and wherein the step of configuring comprises determining that the given stock is to be used in printing the print job.

8. The method of claim 5, wherein the image reproducing apparatus has a print job and wherein the step of configuring comprises changing stocks to be used in printing the print job such that the given stock in used in place of an originally specified stock.

9. An image reproducing apparatus, comprising:

a display for viewing by a user;

an iconic representation of a selected stock shown on the display;

a storage device to store the iconic representation;

an input device for use by user; and a stock control facility for configuring the apparatus for employing the selected stock in response to the user using the input device to drag and drop the iconic representation.

10. The apparatus of claim 9, wherein the apparatus further comprises a drag and drop facility for supporting the dragging and dropping of the iconic representation of the selected stock.

11. The apparatus of claim 9, further comprising a stock library that provides visual representations of multiple stocks and wherein the iconic representation of the selected stock is part of the stock library.

12. The apparatus of claim 9, wherein the iconic representation of the selected stock is a visual representation of an object that encapsulates attributes of the selected stock.

13. The apparatus of claim 9, wherein the apparatus firther comprises a paper tray that is programmable for use with different stocks and wherein stock control facility programs the paper tray to use the selected stock in response to the user using the input device to drag and drop the iconic representation.

14. The apparatus of claim 9, wherein the stock control facility configures the apparatus to use the selected stock for a given print job in response to the user using the input device to drag and drop the iconic representation.

15. A printer, comprising:
    a printer component for printing;
    a print station for controlling the printing component, said print station comprising:
        an input device;
        a display device;
        a stock library containing iconic representations of stocks to be output on the display; and
        a facility for configuring the printer in response to a user dragging and dropping one of the iconic representations with the input device.

16. The printer of claim 15, wherein the input device is a pointing device.

17. The printer of claim 16, wherein the input device is a mouse.

18. The printer of claim 16, wherein the input device is a keyboard.

19. The printer of claim 16, wherein the input device is a light pen.

20. A medium holding instructions for performing a method on an image output device having a display that is visible to a user and a paper tray for holding a selected stock having attributes, said method, comprising the steps of:
    encapsulating the attributes of the selected stock into a selected object;
    storing said selected object in a memory location;
    generating an iconic representation of the selected object on the display; and
    configuring the image output device in response to a user dragging and dropping the iconic representation of the selected stock.

21. The medium of claim 20, whereby iconic representation of the selected object includes a visual representation of at least some of the attributes of the stock.

22. The medium of claim 20, wherein the image reproducing apparatus has a print job and wherein the step of configuring comprises determining that the given stock is to be used in printing the print job.

23. A medium holding instructions for performing a method in an input device, said method comprising the steps of:
    providing an iconic representation of a given stock of the display to be used in the image reproducing apparatus on the display;
    determining initiation of a drag and drop operation of the iconic representation of a given stock by a user; and
    in response to the drag and drop operation of the iconic representation of the given stock by the user, configuring the image reproducing apparatus to account for the attributes of the given stock.

24. The medium of claim 23, wherein the image reproducing apparatus includes a paper tray and wherein the step of configuring comprises programming the paper tray for the given stock.

25. The medium of claim 23, wherein the image reproducing apparatus has a print job and wherein the step of configuring comprises determining that the given stock is to be used in printing the print job.

26. The medium of claim 23, wherein the image reproducing apparatus has a print job and wherein the step of configuring comprises changing stocks to be used in printing the print job such that the given stock in used in place of an originally specified stock.

* * * * *